(12) United States Patent
Röding

(10) Patent No.: US 7,884,038 B2
(45) Date of Patent: Feb. 8, 2011

(54) INTERIOR LINING OR COVERING ELEMENT FOR MOTOR VEHICLES

(75) Inventor: Hubert Röding, Ebrach (DE)

(73) Assignee: Ideal Automotive GmbH, Bamberg (DE)

( * ) Notice: Subject to any disclaimer, the term of this patent is extended or adjusted under 35 U.S.C. 154(b) by 0 days.

(21) Appl. No.: 11/291,076

(22) Filed: Nov. 30, 2005

(65) Prior Publication Data

US 2007/0036979 A1 Feb. 15, 2007

(30) Foreign Application Priority Data

Aug. 9, 2005 (DE) .................... 10 2005 037 572

(51) Int. Cl.
*B32B 5/26* (2006.01)
*B32B 5/14* (2006.01)
*B32B 33/00* (2006.01)

(52) U.S. Cl. .................. 442/381; 442/370; 442/371; 442/372; 442/373; 442/378; 442/389; 428/85; 428/96; 428/92; 428/913.3

(58) Field of Classification Search ............. 442/381, 442/387, 389, 370, 371, 372, 373, 378
See application file for complete search history.

(56) References Cited

FOREIGN PATENT DOCUMENTS

| DE | 87 10 779.1 | | 11/1987 |
|---|---|---|---|
| DE | 93 09 926.6 | | 10/1993 |
| DE | 298 22 755 U 1 | | 7/1997 |
| DE | 19728386 | A1 | 1/1999 |
| DE | 20120605 | U1 | 4/2002 |
| DE | 1325845 | * | 6/2002 |
| EP | 0 512 904 | B1 | 11/1992 |
| EP | 1 325 845 | A2 | 7/2003 |
| WO | 9924290 | A1 | 5/1999 |
| WO | 2005037607 | A3 | 4/2005 |

* cited by examiner

*Primary Examiner*—Lynda Salvatore
(74) *Attorney, Agent, or Firm*—Setter Roche LLP

(57) ABSTRACT

The invention relates to a lining element, in particular an interior lining and/or covering element, for motor vehicles, having a decorative layer and a support layer structure with at least one support layer, in which the air permeability and/or density and/or the mass per unit area of the support layer structure are preset for controlling the acoustic properties, and to a method for producing a lining element, in particular an interior lining element or covering element for motor vehicles, having a decorative layer and a support layer structure of at least one support layer with controlled acoustic properties. In particular, the acoustic properties of the lining element are controlled by matching the thickness, and/or the mass per unit area, and/or the air permeability of the lining element in zones, or over the entire surface, to sound emissions which are to be absorbed.

17 Claims, 4 Drawing Sheets

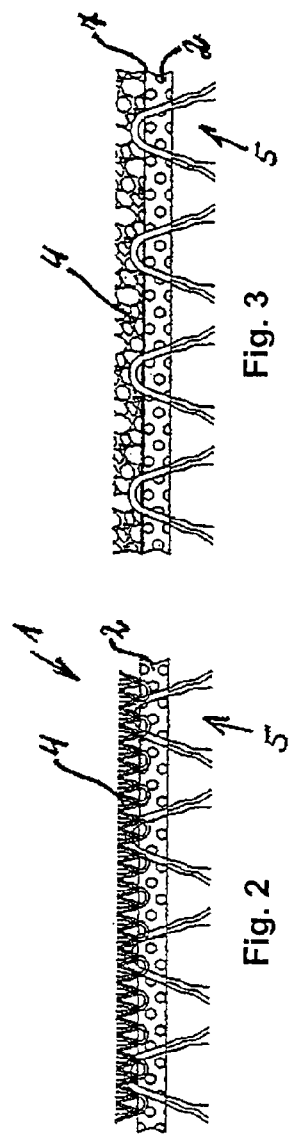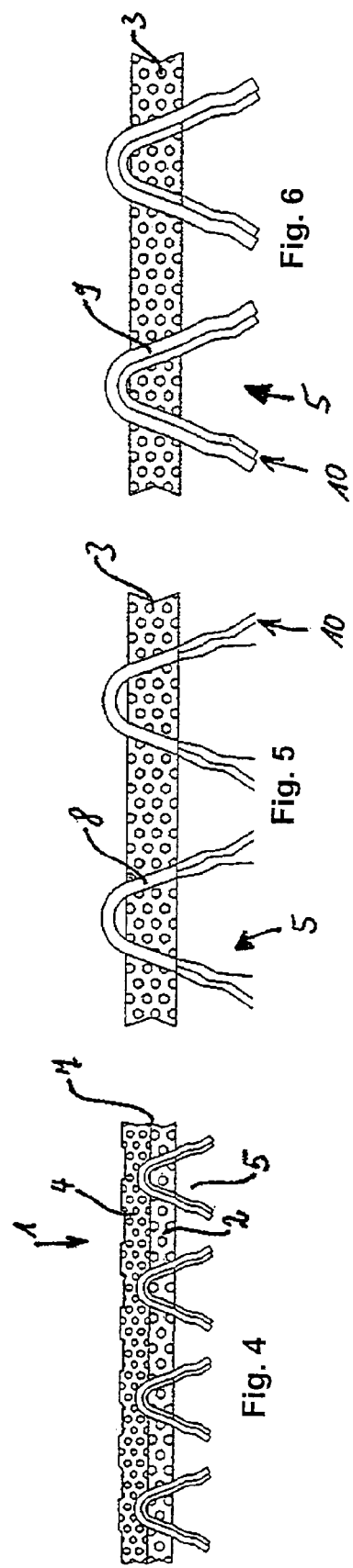

INTERIOR LINING OR COVERING ELEMENT FOR MOTOR VEHICLES

FIELD OF THE INVENTION

The invention relates to a lining element, in particular an interior lining and/or covering element, for motor vehicles, as well as a method of producing the lining element.

BACKGROUND OF THE INVENTION

Lining or covering elements are used in motor vehicles in particular, for example. The covering elements are textile materials in the area of the floor and sides of the interior of the motor vehicle. These covering elements are permanently fixed in the motor vehicle. In addition, there are interior lining elements intended to protect the actual textile covering elements, for example in the floor area (around the feet). Customarily these interior lining elements are arranged to be removable, some can also be removably fastened.

For example, an interior lining element is described as a floor mat in DE-GM 93 09 926. Further interior lining elements are known, for example, from DE 296 22 755 U1, DE-GM 8710779.1 and EP 0 512 904 B1.

An interior lining element is furthermore known from EP 1 325 845 A2. This interior lining element has a decorative layer on the top, a hot-melt adhesive layer, and underneath an underlayer for preventing slippage. The hot-melt adhesive layer connects the underlayer and the decorative layer. The decorative layer consists of a thermoplastic material, it preferably is a tufted cut pile material, tufted loop pile material or a pile needle-punched nonwoven material. It can also be a foil or a woven or knit material. The decorative layer can be designed with a single layer or multi-layered. Incidentally, this is known. Needling or tufting a support is a customary technical process. In the course of tufting, continuous yarns, filaments or small tapes are needled through in loops. The loops on the underside are subsequently cut through, so that the protruding tuft ends are created. The tuft ends of the cut pile protrude downward and therefore grab the covering element in their entirety.

The hot-melt adhesive layer is made of polyolefin. The slip-preventing underlayer is formed from a support and cut pile. The cut pile has been attached by needling, i.e. tufting, to the support. The support is a nonwoven, woven or knit material, which can be thermally bonded for increasing its stability. The mass per unit area of this layer is stated to be 30 to 250 g/m², and 50 to 130 g/m² in particular.

SUMMARY OF THE INVENTION

It is the object of the invention to produce a lining element, in particular an interior lining and/or covering element for motor vehicles, by which it is possible to design the interior of a vehicle for greater comfort, in particular in regard to noise levels.

This object is attained by way of a lining element, in particular an interior lining and/or covering element for motor vehicles, having the characteristics of claim 1. Advantageous further developments are characterized in the dependent claims.

In accordance with the invention, a lining element, and in particular a covering and/or interior lining element, has controllable acoustic properties. Controllable acoustic properties means that the covering and/or interior lining element has at least one support layer, whose acoustic properties have been preset. In the simplest case a single layer is used, which has a preset air permeability. An interior lining and/or covering element with great air permeability has very low sound-insulating properties, while an interior lining and/or covering element with very low air permeability has very great sound-insulating properties.

The acoustic properties can basically be influenced in that the covering and/or interior lining element absorbs or reflects sound, or both absorbs and reflects sound.

The air permeability of a textile layer, in particular a nonwoven and/or woven material, can be controlled by the number of fibers per m², or density in regard of the weaving, and of course also by means of the properties of the fibers, such as titer, length and material.

It is furthermore possible to make the covering and/or interior lining material with two or more layers. With a two-layered structure, for example, the decorative layer is a pile layer and the underlayer a tufted layer, wherein there are two support layers, for example two support nonwoven materials, and in particular two identical nonwoven materials, such as spun-bonded material, needle-punched nonwoven material or the like. Woven or knit materials are of course also possible as support layers. The support layers are connected with each other by a hot-melt layer, for example, wherein the air permeability of the entire bonded element can be determined by the thickness of the support layers, as well as by the density of the hot-melt layer. The hot-melt layer can be applied in powder form, in the form of dots, or in linear or net shapes, for example, and can subsequently be thermally activated in the course of lamination. In this case the number of the hot-melt adhesive dots or the density of the network of hot-melt adhesive per area, or the thickness of the layer applied in powder form, determines the air permeability, and therefore the acoustic effect (for example absorption, muffling, insulation).

It is furthermore possible to arrange a film layer between the support layers, with or without hot-melt layers. This can be a thin, in particular flexible foil, such as a plastic foil. It is furthermore possible to use metal foils, which have particularly low air permeability. These furthermore have high reflection capabilities, not only for sound, but also for temperature. Therefore a metal foil arranged between the support layers makes sense in the areas of the interior or trunk which are subjected to high thermal loads, in particular from exhaust pipes.

For example, such metal foils or metal nets in interior lining and/or covering elements also make sense when being used in separating walls, for example behind the rear seat of a motor vehicle. This configuration makes it possible to shield the antennas at the back of the vehicle from the interior of the vehicle, so that the vehicle interior or the antennas do not mutually interfere with each other. This is particularly important for electromagnetic compatibility, which becomes more critical with the increasing number of antennas in motor vehicles. In this case the conductive layer is moreover connected with the mass of the vehicle, wherein appropriate connecting areas, for example contact elements or the like, are arranged on the lining element. First, appropriate surface resistances, or high conductivity for EMC capabilities must be determined and must be maintained. It is important to use oxidation-resistant, highly conductive materials, such as metals or carbon, which do not oxidize in use.

It is furthermore possible to arrange a particularly heavy plastic layer between the support layers. Plastic foam or plastic layers containing a large amount of a heavy filler material, for example, constitute such especially heavy layers, which therefore have good sound-insulating properties. Metal oxides, such as zinc oxide, or minerals, such as barite, but also metal pigments or metallocenes and elemental metals in powder or dust form are particularly heavy filler materials. These, in particular $Fe_3O_4$, also meet the requirements made on conductivity and oxidation resistance of an electrically conductive layer, so that both effects can be realized by this.

It can be particularly advantageous to change the acoustic properties over the surface of the covering and/or interior lining element. If it is intended to prevent booming effects from surfaces, for example, it can make sense to provide a particularly heavy intermediate layer in areas in which the greatest vibration amplitudes occur, while in those areas in which vibration nodes exist, the lining element can be designed to be relatively light and therefore reasonable. By this configuration it is therefore possible to react to the creation of sound in the vehicle in a manner which is optimized in regard to the weight of the vehicle. It is furthermore possible to already embody the covering element with an acoustically effective layer matched to the noise in the areas of particularly strong noise generation, and moreover to place a releasably fastened interior lining element in particular on the floor, which is also acoustically effective.

Instead of gluing together the support nonwoven materials in case of a multi-layered structure, it is also possible to mechanically connect the support nonwoven materials and a textile, acoustically effective layer possibly arranged between them, for example by sewing or stitching them together. The acoustically effective layer, especially if it is a textile layer, can also be embodied as a nonwoven, or knit or woven material in such a way that a part or all of the fibers are metallic fibers, which not only have a large weight, but also provide good electromagnetic shielding.

Since covering elements as well as interior lining elements for motor vehicles are separately made to order and preformed for the specific areas, it is possible to also set different acoustic properties in a controlled manner without problems. For example, a covering element for the floor in the area of a driveshaft tunnel can have different properties than a covering underneath the seating area or, for increasing the insulating output, can have a particularly great insulating effect in the area of the firewall or of the front upper foot area.

It is also possible in principle to control the acoustic properties in that the acoustically effective layer is formed from several individual layers, wherein sound-reflecting layers, i.e. particularly dense and heavy layers, and sound-absorbing layers, such as foam layers or cotton wool-like nonwoven or knit layers, alternate. Thus, it is possible by the alternation of absorption and reflection to filter out defined frequencies, which are introduced into this area, in a particularly effective manner and in a specific way.

The invention will be explained by way of the drawings.

BRIEF DESCRIPTION OF THE DRAWINGS

FIG. 2 shows a further embodiment of the invention with a support layer.

FIG. 3 is a still further embodiment of the invention wherein the decorative layer is embodied as a needle-punched web.

FIG. 4 shows a further embodiment of the invention wherein a decorative layer has been placed above a support layer.

FIG. 5 schematically shows the structure of a lower support layer which was needled in during a tufting pile process.

FIG. 6 shows a further embodiment of the invention in accordance with FIG. 5, wherein the tufting pile needling has been performed with monofilaments.

DETAILED DESCRIPTION OF THE PREFERRED EMBODIMENTS

In a first embodiment, a lining element 1 in accordance with the invention, in particular an interior lining or covering element 1 for motor vehicles (FIG. 1) (only called a lining element in what follows), has a first support layer 2 and a second support layer 3. For example, the first support layer 2 is a nonwoven material and the second support layer 3 is also a nonwoven material, wherein both support layers can be designed to be identical, in particular in the form of spunbonded material. The support layers 2, 3 lie flat one on top of the other. The support layer 2 and the support layer 3 can also be made of different nonwoven materials.

The support layer 2 and the support layer 3 can also be made from knit or woven materials, wherein the support layers 2, 3 are either designed to be identical or different. For example, the support layer 2 can be embodied as a nonwoven material and the support layer 3 as a woven material.

Figure 1:
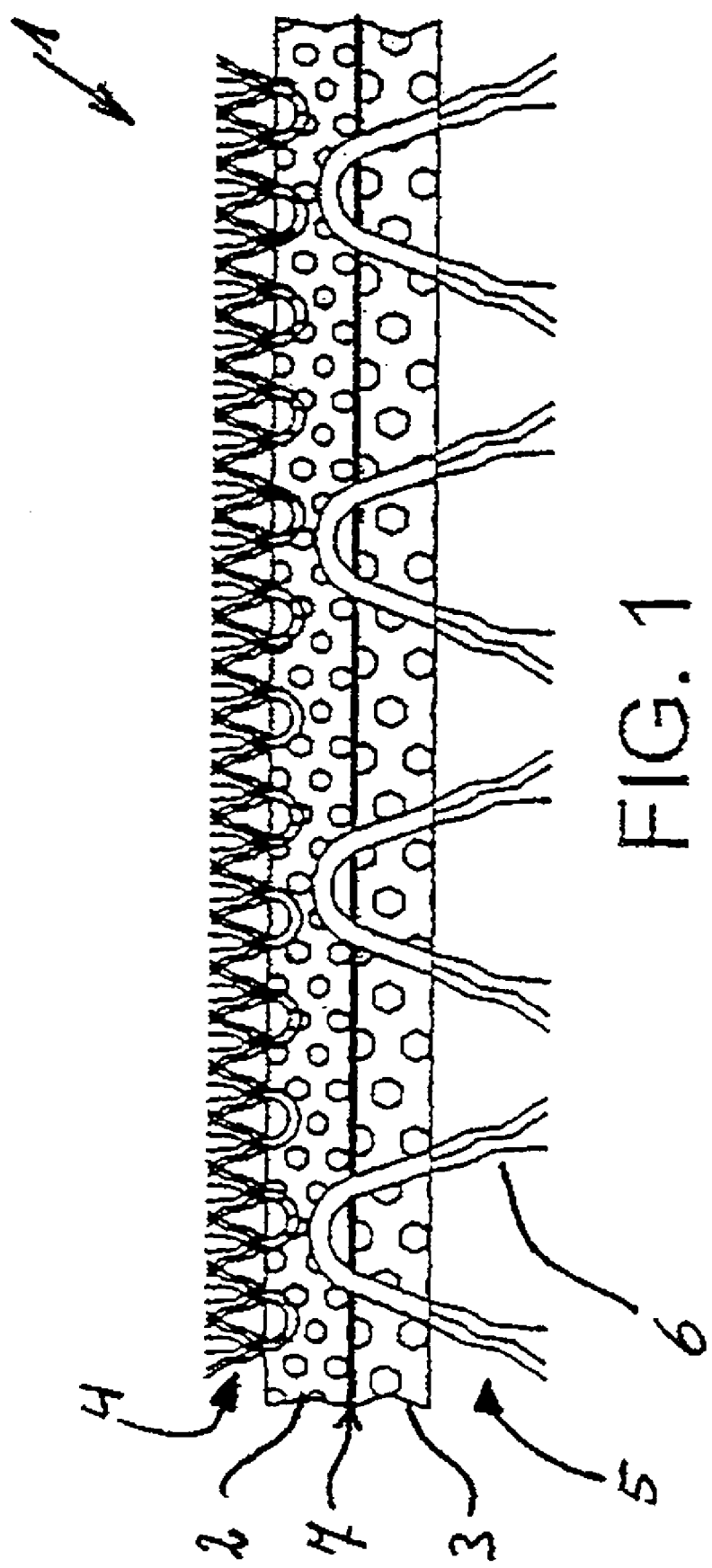
FIG. 1 shows a first embodiment of the invention with a structure comprising two support layers.

On its top, the support layer 2 has a decorative layer 4. The decorative layer 4 may consist of a thermoplastic material in particular. Preferably the decorative layer may consist of a tufted cut pile material, tufted loop pile material or a pile needle-punched nonwoven. In a known manner, the decorative layer can be designed as one layer or with many layers. In FIG. 1, the decorative layer 4 is a cut pile layer tufted into the support layer 2. Underneath the support layer 3, i.e. located opposite the support layer 2 and on the side facing away from the support layer 2, the support layer 3 has an underlayer 5. For producing the underlayer 5, the support layer 3 is needled with continuous yarn or small continuous tapes by means of a cut pile velour process, and the loops of the continuous material being created in the course of tufting are cut open, so that a cut pile is formed.

The support layer 2, the support layer 3 and the underlayer 5, as well as possibly the decorative layer 4, are made of a thermoplastic material, especially polypropylene (PP), polyester, copolyester, polyamide, or a mixture of the materials, in particular PET/PA, PET/PP, PET/CoPET.

The continuous yarn used for producing the cut pile has a titer value of, for example, 1000 to 6000 dtex, wherein a single filament (thread) of which the yarn consists has a titer value of 17 to 300 dtex, in particular 44 to 57 dtex. The yarn can be a CF yarn, i.e. a yarn made of continuous filaments. Preferably a BCF yarn, i.e. a textured yarn made of continuous filaments, is used. The cut filaments of such a textured yarn tend to spread open. Thus, the individual filaments of the yarn spread open after the mentioned cutting of the loops, which improves sliding resistance, because many spaced-apart pile ends are created by this.

The small continuous tapes are fibrillated, so that a multitude of pile ends are created after the mentioned cutting open of the protruding loops. The small continuous tapes can be fibrillated or not fibrillated, twisted or not twisted within a titer range of 300 dtex to 10,000 dtex. Use of fibrillated small continuous tapes for producing the cut pile 6 is advantageous, because roughened edges are created by the fibrillation, which assist with adhesion to the support layer 3. The cut pile 6 is formed, for example, by means of tufting in such a way that the number of perforations at the support 5 is 8 to 50, preferably 25 to 40, perforations per 10 cm of length of the support layer 3. The spacing between columns of the loops of the cut pile 6 is such that 8 to 50 columns, preferably 25 to 40 columns, per 10 cm of the width of the support 5 exist. Consequently, an approximately square pattern of protruding pile ends is created on the underside surface of the lining element.

For stabilizing the support layers 2 and 3 it is possible to thermally bond the nonwoven, woven or knit materials, which form the support layer 2 and the support layer 3. The mass per unit area of the support layers is 30 to 300 g/m², in particular 50 to 175 g/m².

A connecting layer 7 is arranged between the support layers 2 and 3. The connecting layer 7 is, for example, an adhesive layer 7 consisting of a thermoplastic adhesive. The thermoplastic adhesive is, for example, a polyolefin. This adhesive can be applied to one of the support layers 2 or 3 in powder form, brushed on, applied as dots or in the form of a line or net pattern to one of the support layers.

In a further advantageous embodiment, the connecting layer 7 consists of a plastic foil coated on both sides with an adhesive layer. The plastic foil is, for example, a polyamide, polypropylene, polyethene or polyurethane foil of a thickness of 10 μm to 150 μm or more. In connection with thick foils in particular, which are made of a thermoplastic material, it is possible to omit the adhesive layers, or the adhesive layers can be designed in such a way that up to a thermal activation of the foil these adhesive layers merely provide a first mechanical connection required for further processing.

In a further advantageous embodiment, the connecting layer 7 consists of a laminated foil, which has adhesive layers on both sides, if desired. The laminated foil can be made of a plurality of plastic foils of the same or different plastic materials. In a further advantageous embodiment, at least one foil of the laminated foil consists of a metal foil, such as aluminum foil.

Furthermore, the connecting layer can also consist of a laminate which has adhesive layers or thermally activatable adhesive layers towards the support layers 2, 3, wherein the connecting layer is embodied as a composite or laminate made of several layers. This plurality of layers (not represented) can be, for example, plastic and/or metal foils, wherein thin nonwoven layers or plastic foam layers are arranged between the plastic and/or metal foils.

In a further embodiment of the connecting layer 7, the connecting layer 7 is embodied of plastic or plastic foam, wherein the plastic or plastic foam additionally contains metal particles, heavy metal oxide particles, heavy minerals or metallocenes, in order to develop as large as possible a mass per unit area.

The above mentioned different embodiments of the connecting layer 7 for producing an intermediate layer 7 can also be combined with each other.

By way of the respective embodiment of the connecting layer 7 as a simple adhesive layer, as a laminated foil made of plastic foils, a laminated foil made of plastic and/or metal foils, as well as of plastic foam or combinations of these it is possible to adjust the acoustic properties of the lining elements very delicately. Thus, it is possible in particular to affect the air permeability, which is a measure of the acoustic effectiveness.

It is moreover possible to affect the air permeability also by way of the density of the support layers 2, 3, so that the air permeability of a material which is woven very tightly and under a great force is clearly less than that of a very wide-meshed nonwoven material.

It is possible to combine the air permeability of the support layers 2, 3 with a sound-absorbing or sound-reflecting effect of the intermediate layer 7, or connecting layer 7. In particular with the combination of foils, also metal foils, with interposed nonwoven or plastic foam layers, i.e. of thin sound-reflecting and thin sound-absorbing layers, it is possible to finely match the acoustic effect of the lining elements to defined frequency bands. By means of a particularly heavy intermediate layer formed either by a very dense plastic material or loose plastic foam it is also possible to reduce low frequencies, such as booming, by virtue of the great weight and the strong reflection properties of dense layers in particular.

The first embodiment can already be realized with great success in that the amount of adhesive is set by means of the amount of adhesive, and the adhesive distribution via the density, wherein densities up to 2 g/cm³ are possible.

In connection with a further advantageous embodiment (FIG. 2), only a single support layer 2 is provided, wherein the support layer 2 corresponds to the support layer 2 of the first exemplary embodiment. Accordingly, the air permeability, and therefore also the sound-absorbing effect, of the support layer 2 is preset by its density. Thus, the support layer consists of a nonwoven, a woven or a very tightly knit material wherein, if required for increasing the density and cohesion, this support layer is thermally or chemically bonded. In case of chemical bonding, an appropriate finish of a compressing or gluing material is applied. This support layer 2 of the second embodiment has a decorative layer 4 on top, which can correspond to the decorative layer 4 of the first embodiment. With this embodiment the underlayer has been tufted in from the side located opposite the decorative layer. It is of advantage with this embodiment that, because of the single-layer structure, it is possible in a quite advantageous manner to produce a covering or interior lining element having controllable acoustic properties.

In a further embodiment (FIG. 3), the support layer 2 and the underlayer 5 correspond to the embodiment in accordance with FIG. 2 wherein, however, the decorative layer 4 is embodied as a needle-punched nonwoven decorative layer. Analogous to the first exemplary embodiment, a connecting layer 7 can be provided between the needle-punched nonwoven decorative layer and the support layer 2. Here, the connecting layer has a structure which can correspond in all possible embodiments to the first embodiment of the lining element. Accordingly, this lining element differs from the first embodiment in that the decorative layer 4 does not have its own support layer 2, but that instead a common support layer 2 exists for the underlayer and the decorative layer 4.

In a further advantageous embodiment, in contrast to the embodiment in accordance with FIG. 3 there is a glued-on decorative foil layer in place of a needle-punched nonwoven decorative layer. In this case its is also possible for a connecting layer 7 to be provided between the decorative foil layer 4 and the support layer 2, which can also be embodied in the same way as the connecting layer 7 in the first exemplary embodiment.

In FIG. 5, loops 8 tufted into the support layer 2 can be seen, which have been cut open so that the cut pile 6 is created, which has individual yarn loops 8 or individual small continuous tapes 9 (FIG. 6).

A suitable production method for the lining element will be described in what follows.

The support layer 2 and the decorative layer 4 are produced in a first method step wherein, for example, cut pile loops are tufted into the support layer 2. The support layer 2 and the underlayer 5 on the other side, or the cut pile 6, are also first produced by tufting, and are prefabricated as web material. In connection with a first embodiment, the created webs are connected with the connecting layer 7, wherein the adhesive is also applied to the support layer 3 and/or the support layer 2 as a powder, as dots, applied in webs or applied in the shape of a grid or a nonwoven material, or is sprayed on. Subsequently the two web materials are connected with each other. This can take place in various ways. It is possible to guide the two webs over rollers, wherein the connecting layer 7 is supplied in a gap existing between the rollers, for example by means of a sheet mold, in the course of the thermoplastic process. In a further embodiment the connecting layer is melted, for example by means of an infrared device or other suitable devices, and thereafter the web materials are laminated to each other. Here, lamination can take place under low pressure, or by calendering at high pressure. In the course of connecting the layers 2, 4 or 3, 5, prefabricated in the form of web materials, it is advantageous that the final product being created in the process is also a web material, out of which the most diverse contours can be punched or cut. In a further embodiment, in particular if it is intended to deform the covering and/or interior lining material three-dimensionally, the precut or prepunched flat layer is placed into an appropriate molding tool, a correspondingly precut or prepunched layer 3, 5 is also placed into the molding tool, and then the layers 2, 3, 4, 5 are connected by means of the molding tool with the melt layer or connecting layer 7.

If foils or laminated foils, or generally other than only adhesive-containing connecting layers 7 are inserted, it is possible to draw off the support layer and the decorative layer 4, on the one hand, the support layer 3 and the underlayer 5, on the other hand, as well as the foil layer, from three feed rolls, and they can then be laminated or calendered on top of each other. A metal foil, preferably a micro-perforated metal foil, can be laminated or calendered between the layers in the process.

If it is intended to produce an interior lining or covering element with varying acoustic properties, the connecting layer, for example, is differently designed in zones. This can take place in that already in the course of producing the connecting layer, in particular if the connecting layer is designed as a laminated foil, more foil layers, or doubled foil layers, are applied to highly sound-absorbing areas. In that case the connection with each other of the connecting layer 7 and the remaining layers of the interior lining element takes place in molding tools. In the simplest case, different densities, and therefore air permeabilities and acoustic properties, are provided in that in the course of applying powder or the connecting layer as an adhesive layer in those areas in which a greater density is to be achieved, the powder is applied in larger amounts or spaced more closely together or in the form of lines or patterns.

This can be done when the layers are drawn off in the form of web materials, but can also take place in a particularly advantageous and easily controlled manner in that, already prior to punching out the parts, the parts are thereafter powdered or coated with an appropriate pattern, wherein the powder or coating pattern is achieved by means of a special device, which in this case always applies the same, regionally different pattern. For representing a particularly air-permeable layer it is also possible to use small woven tapes, for example a particularly wide-meshed net/grid as the connecting layer in place of applying powder or a coating.

If a lining element in accordance with the invention is used as a covering element, it is possible to omit the cut pile 6, if desired. If the lining element is used as an interior lining element, which is placed on top of a covering element, the interior lining element provides a connection by means of its pile ends 10 (FIGS. 5 and 6) entering the textile structure of the covering element so that the interior lining element can hardly shift, even if subjected to forces parallel with respect to the level of the covering element.

Figure 7:
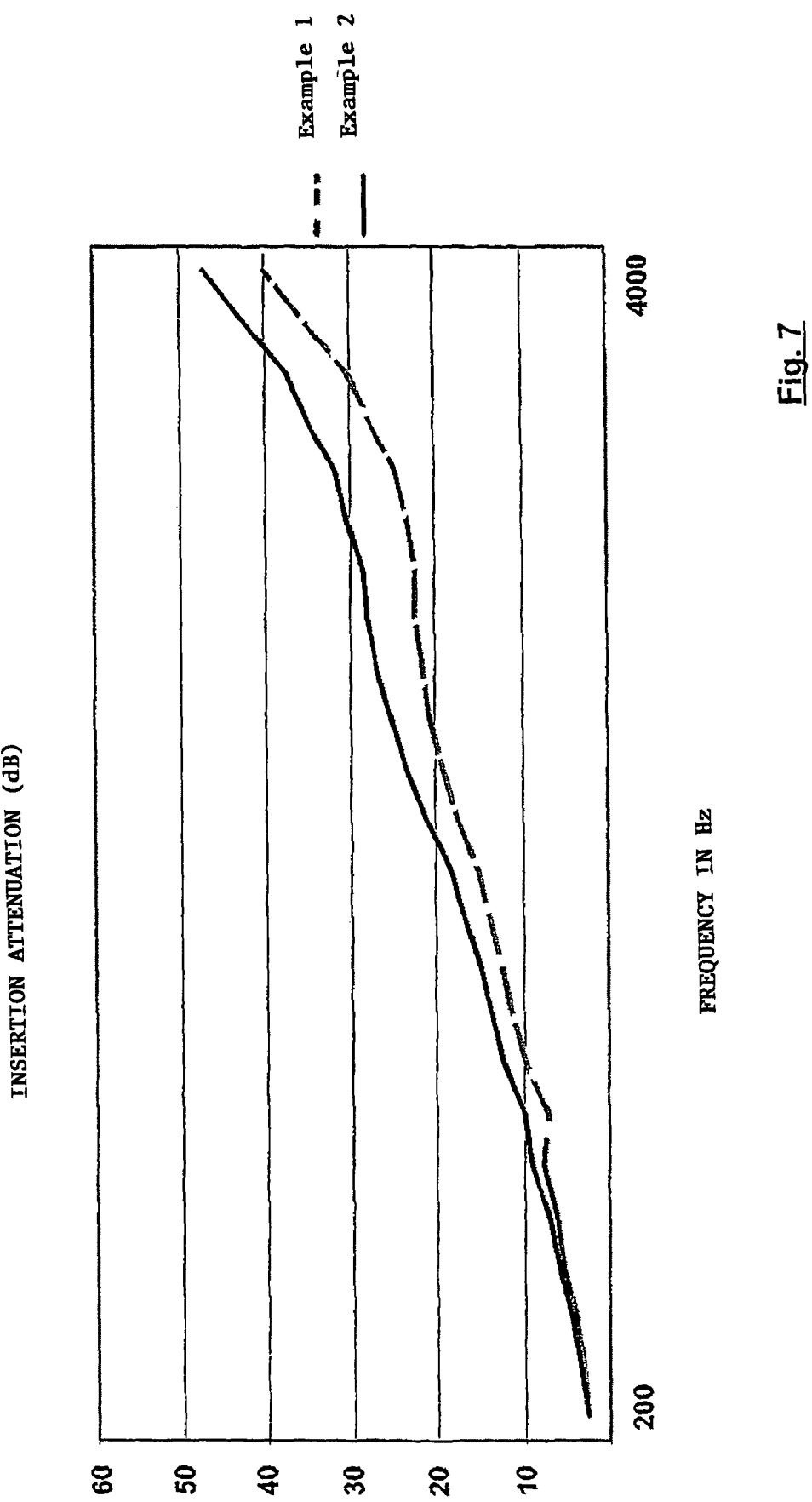
FIG. 7 is a diagram representing the insertion attenuation of two examples.
Figure 8:
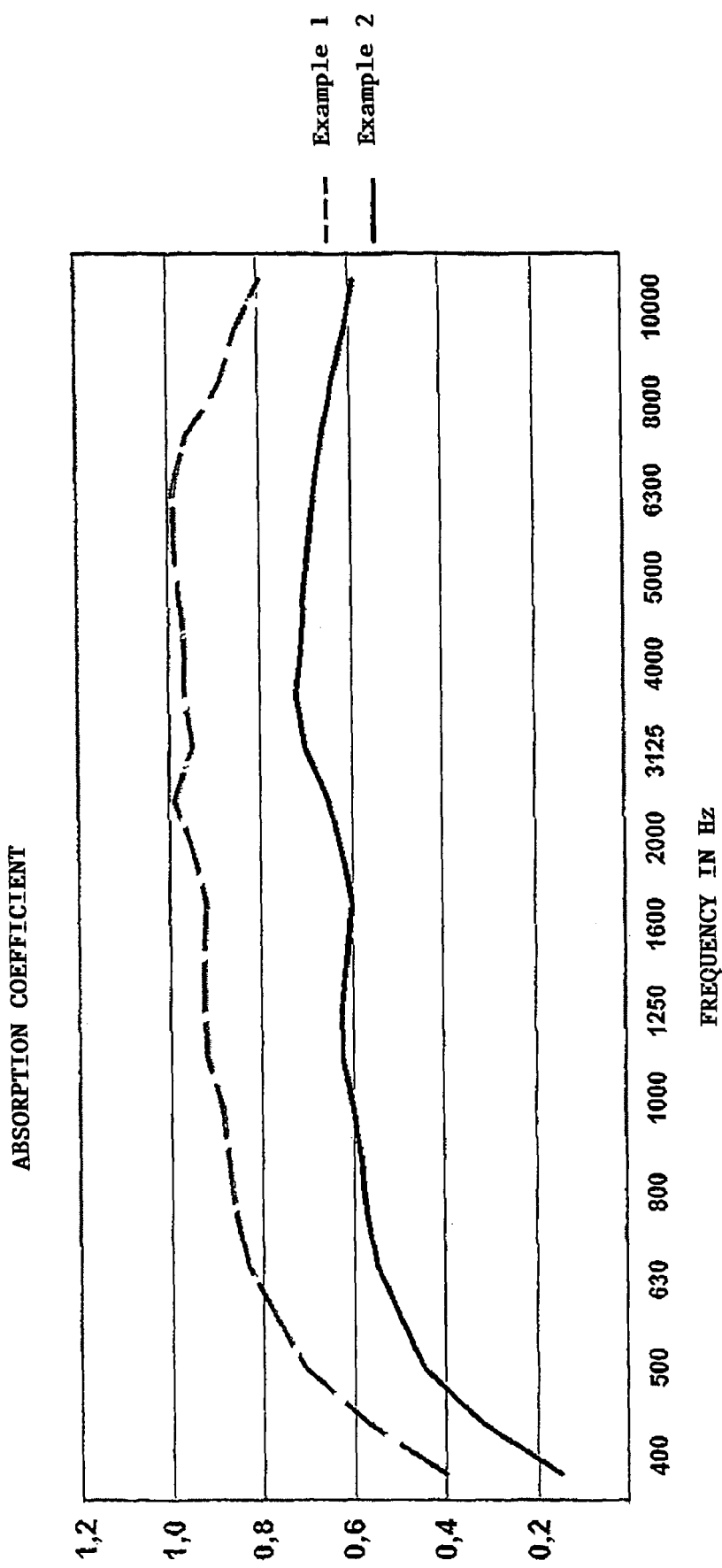
FIG. 8 is a diagram showing the absorption coefficients of the examples in FIG. 7.

FIGS. 7 and 8 show diagrams regarding the acoustic properties of two examples or tests. These tests were performed in accordance with methods known per se in a so-called α-chamber.

The diagram in FIG. 7 represents the insertion attenuation by means of the two examples, while FIG. 8 represents the absorption coefficients of the examples. High absorption properties along with low insertion attenuation (example 1), or low absorption properties along with higher values of the insertion attenuation (example 2), can be achieved by optimized settings in the support layers. Depending on the structure and the flow resistance, the values for air sound absorption and insertion attenuation vary. In this case the insertion attenuation is a measure of the reduction of vibrations.

What is claimed is:

1. A lining element, in particular an interior lining and/or covering element, for motor vehicles, comprising:
   a decorative layer; and
   a support layer structure attached to the decorative layer, the support layer structure including an intermediate layer that is arranged between two support layers and mechanically connected to the support layers, the intermediate layer having a non-uniform thickness and/or non-uniform mass per unit area and/or non-uniform air permeability,
   wherein an air permeability and/or density and/or a mass per unit area of the support layer structure are preset for controlling acoustic properties by matching the thickness, and/or the mass per unit area, and/or the air permeability of the lining element in zones, or over an entire surface, to sound emissions which are to be absorbed, with increased thickness and/or mass per unit area and/or reduced air permeability in the zones that have greater sound emissions to absorb.

2. The lining element in accordance with claim 1, wherein the intermediate layer has been designed as a single layer.

3. The lining element in accordance with claim 1, wherein the intermediate layer has been designed as multiple layers.

4. The lining element in accordance with claim 1, wherein the intermediate layer is an adhesive layer applied to one of the support layers as a powder, or over a surface of the support layer, or in strips or dots or other patterns, in dry or molten liquid form.

5. The lining element in accordance with claim 1, wherein the intermediate layer is a foil layer.

6. The lining element in accordance with claim 1, wherein the intermediate layer is a lamination of plastic and/or metal foils and/or nonwoven materials and/or plastic foam and/or other textile layers.

7. The lining element in accordance with claim 5, wherein the intermediate layer is formed of dense foil layers made of plastic or metal foil and less dense textile or plastic foam layers, which alternate with each other.

8. The lining element in accordance with claim 1, wherein the support layers are textile layers made of a nonwoven and/or knit and/or woven material.

9. The lining element in accordance with claim 1, further comprising an underlayer located opposite the decorative layer, wherein the underlayer comprises continuous yarns or small continuous tapes, which are needled using a tufting cut pile method, wherein the loops created in the continuous material in the course of tufting are cut open, so that a cut pile is formed in the underlayer.

10. The lining element in accordance with claim 1, wherein, for a connection with the mass of the vehicle, the lining material comprises a conducting layer having a connecting area.

11. The lining element in accordance with claim 10, wherein the conducting layer is made of oxidation-resistant, highly conductive materials, which do not oxidize in the course of their employment.

12. The lining element in accordance with claim 1, wherein a plastic layer, which is particularly heavy, is arranged between at least two of the support layers, and the plastic layer comprises plastic foam or plastic layers containing a large proportion of a heavy filler materials.

13. The lining element in accordance with claim 12, wherein the filler material is made of metal oxides, such as zinc oxide, or minerals, such as barite, and/or metal pigments, and/or metallocenes, and/or elemental metals in powder or dust form, so that the heavy layer is also designed as a conductive layer, if desired.

14. The lining element in accordance with claim 12, wherein the heavy filler material is $Fe_3O_4$.

15. The lining element in accordance with claim 1, wherein the intermediate layer is made of a woven small tape material, for example a particularly wide-meshed net/grid, to achieve a particularly air-permeable layer.

16. A lining element, in particular an interior lining and/or covering element, for motor vehicles, comprising:
 a decorative layer;
 a single support layer; and
 an underlayer provided opposite the decorative layer in the support layer;
 the decorative layer attached to the single support layer by a connecting layer having a non-uniform thickness and/or non-uniform mass per unit area and/or non-uniform air permeability, the connecting layer comprising an adhesive applied as a powder or in strips, dots or other patterns in dry or molten liquid form, and the underlayer comprising yarn loops or individual continuous narrow ribbons tufted into the single support layer,
 wherein an air permeability and/or density and/or a mass per unit area of the single support layer are preset for controlling acoustic properties.

17. A lining element, in particular an interior lining and/or covering element, for motor vehicles, comprising:
 a support layer structure including a first support layer attached to a second support layer by a connecting layer, the connecting layer comprising an adhesive applied as a powder over a surface of the first support layer or the second support layer, or in strips or dots or other patterns in dry or molten liquid form;
 a decorative layer on a side of the first support layer opposite the second support layer;
 an underlayer located on a side of the second support layer opposite the first support layer, wherein the underlayer comprises continuous yarns or small continuous tapes, tufted into the second support layer, wherein loops created in the continuous material in the course of tufting are cut open, so that a cut pile is formed in the underlayer;
 wherein an air permeability and/or density and/or a mass per unit area of the support layer structure are preset for controlling acoustic properties.

* * * * *